United States Patent [19]

Hall

[11] 4,196,800

[45] Apr. 8, 1980

[54] APRON-CONVEYOR CONNECTION FOR LOADING AND CONVEYING MACHINES

[75] Inventor: Henry C. Hall, Green Bay, Wis.

[73] Assignee: Northwest Engineering Company, Green Bay, Wisconsin

[21] Appl. No.: 939,782

[22] Filed: Sep. 5, 1978

[51] Int. Cl.² .............................................. B65G 65/02
[52] U.S. Cl. ................................... 198/318; 198/517; 198/522; 198/308
[58] Field of Search ............... 198/308, 318, 517, 520, 198/522; 414/565, 566, 567

[56] References Cited

U.S. PATENT DOCUMENTS

| 4,011,936 | 3/1977 | Hall | 198/517 |
| 4,011,937 | 3/1977 | Brandtsen | 198/517 |

*Primary Examiner*—Jeffrey V. Nase
*Attorney, Agent, or Firm*—Andrus, Sceales, Starke & Sawall

[57] ABSTRACT

A loading and conveying machine has crawler treads and a frame extending forwardly thereof. A conveyor extends from the front to the rear of the machine. An apron is pivotally mounted at the front of the frame and receives material from a loading implement and deposits it onto the conveyor. The front end of the conveyor is pivotally mounted to the apron and arcuately moves about the apron pivot axis when the apron is raised or lowered. The axis of apron-conveyor pivotal mount is removed from the center of rotation of the front end of the conveyor and spaced rearwardly and downwardly therefrom. The distance between the rear apron edge and the axis of apron-conveyor pivotal mount is greater than the distance between the said edge and the center of rotation of the front end of the conveyor. The axis of apron-conveyor pivotal mount is disposed in a transverse vertical plane which is positioned between the rear apron edge and the center of rotation of the front end return portion of the conveyor.

5 Claims, 5 Drawing Figures

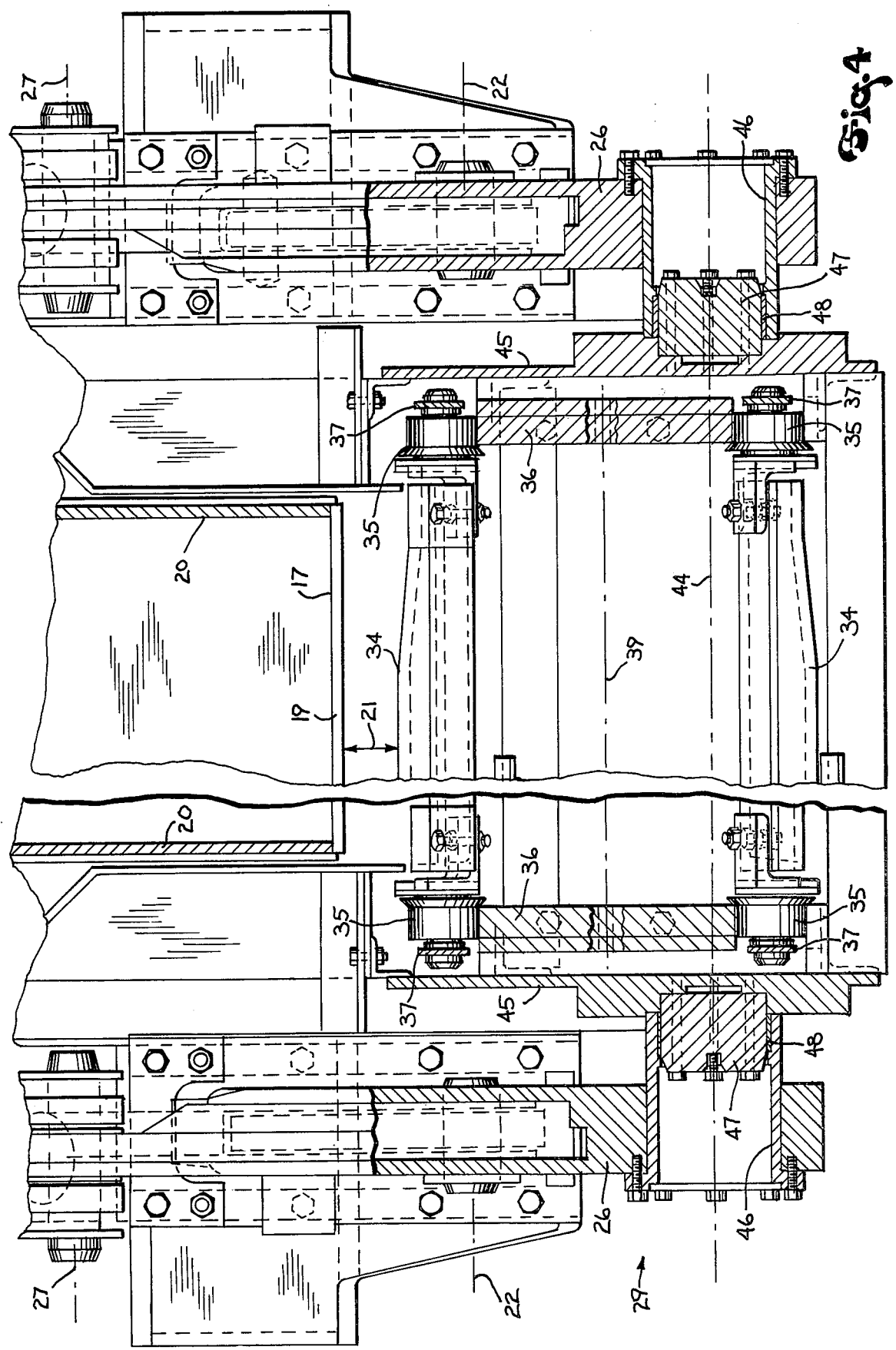

APRON-CONVEYOR CONNECTION FOR LOADING AND CONVEYING MACHINES

BACKGROUND AND SUMMARY OF THE INVENTION

This invention relates to an apron-conveyor connection for loading and conveying machines, and is an improvement over the connection concept disclosed in U.S. Pat. No. 4,011,936 issued to Henry C. Hall on Mar. 15, 1977 and entitled "Conveyor Positioning Structure For Loading And Conveying Machines".

Such machines utilize a front end gathering implement to sweep rock, sand, ore or other lose material onto a self-contained conveyor for transport to a discharge location, usually disposed at the rear of the machine. An apron is disposed at the forward conveyor end, has a front end edge adapted to move forwardly along the ground with the machine and a rear end portion over which the material moves onto the conveyor. The gathering implement is normally mounted to the front portion of the machine frame, extends substantially ahead of the apron and is adapted to force material up the inclined apron.

Vehicle transport means, such as crawler treads, support the machine on the ground and may be positioned substantially behind the apron and front frame portion to move the center of gravity of the entire device rearwardly in view of the substantial weight forces at the front.

The loading and conveying machines under consideration here can be utilized in tunneling operations, although it is contemplated that they may find more extensive use above ground. In any event, they are often subject to variations in level of terrain, both during actual loading and also during transport from place to place.

It has been found that the gap or clearance space between the rear apron edge and the conveyor should be as narrow as possible. If material rolls backwardly down the inclined conveyor, as sometimes happens, it may tend to enter a gap which is too wide and thereby jam the mechanism.

In the aforementioned patent, the gap width was narrowed by pivotally mounting the front end of the conveyor to the apron itself. The pivotal mounting defined a single axis which was common to both the center of rotation of the conveyor on its front sprockets, as well as to the mounting shaft connecting the apron and conveyor.

When the apron and conveyor are pivotally connected, and as the apron is raised or lowered, the apron carries the conveyor front end with it. As part of this movement, the gap between the rear apron edge and conveyor varies in width within a given range. The smaller the gap and its variance in width, the less chance there is for jamming and other problems created as the loaded material passes over the rear apron edge onto the conveyor.

It is a task of the present invention to reduce the gap and its range of width even further than that provided by the structure of the aforementioned patent, without causing the major machine parts to collide with one another.

In accordance with one aspect of the invention, the axis of apron-conveyor pivotal mount is removed from the center of rotation of the front end of the conveyor and spaced rearwardly and downwardly therefrom.

In accordance with another aspect of the invention, the distance between the rear apron edge and the axis of apron-conveyor pivotal mount is greater than the distance between the said edge and the center of rotation of the front end of the conveyor.

In accordance with yet another aspect of the invention, the axis of apron-conveyor pivotal mount is disposed in a transverse vertical plane which is positioned between the rear apron edge and the center of rotation of the front end return portion of the conveyor.

BRIEF DESCRIPTION OF THE DRAWINGS

The accompanying drawings illustrate the best mode presently contemplated by the inventor for carrying out the invention.

In the drawings:

FIG. 4 is a sectional view taken on line 4—4 of FIG. 3; and

DESCRIPTION OF THE PREFERRED EMBODIMENT

Figure 1:
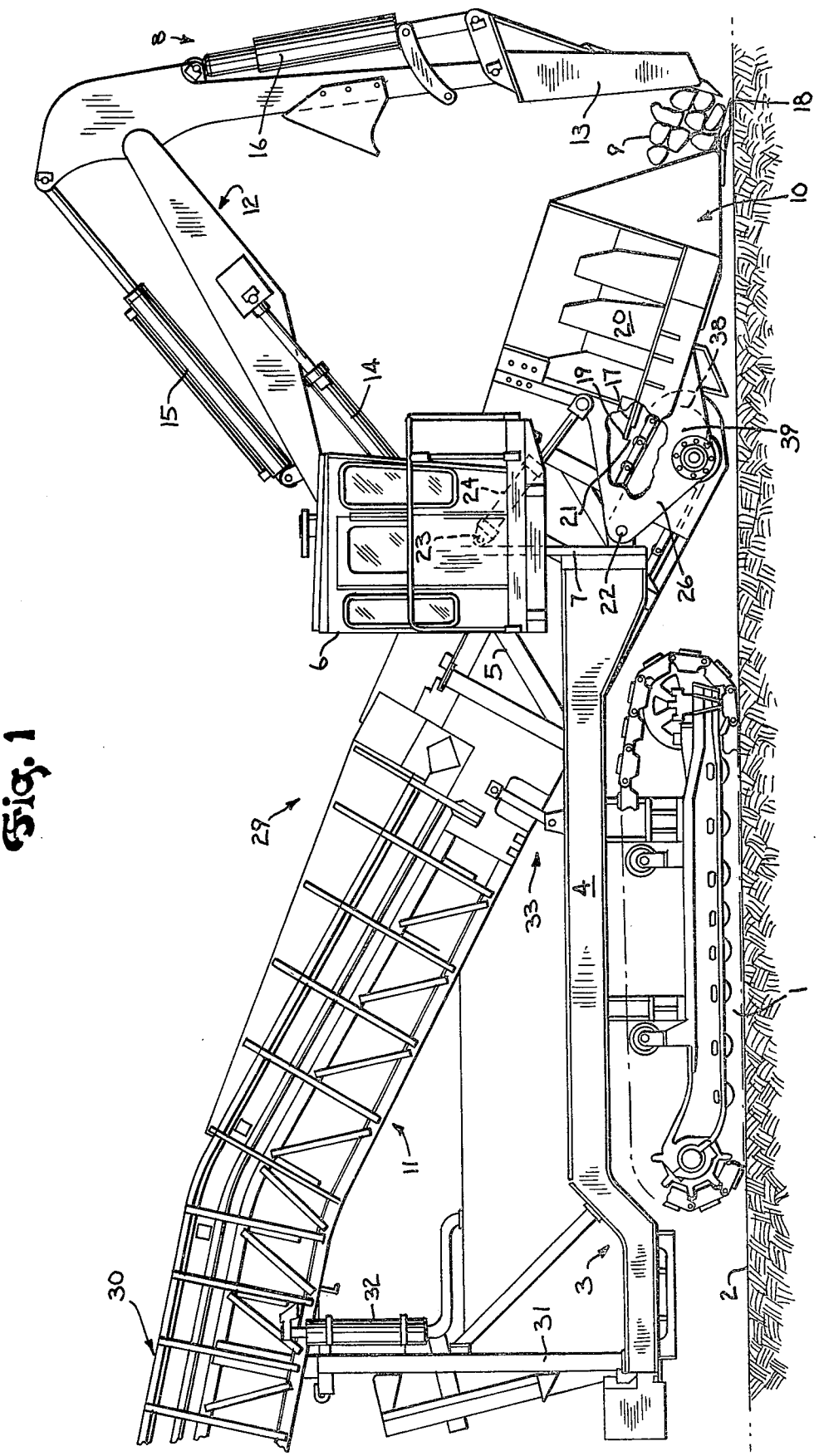
FIG. 1 is a side elevation of a loading and conveying machine constructed in accordance with the invention and with the apron in its lowered position.

As shown in the drawings, the invention is embodied in a material loading and conveying mechanism having vehicle transport means such as crawler treads 1 which support the machine on the ground 2 and are driven by any suitable means, not shown, to move the machine during loading operations and for travel between operating sites. The front end portion of treads 1 describe an arc and the treads form part of an assembly which supports the machine frame 3 which includes spaced longitudinal side rails 4, brace elements 5, and a forwardly mounted operator's cab 6. A pair of vertical mounting plates 7 are disposed on the front of frame 3.

The machine disclosed herein includes a gathering implement assembly 8 adapted to engage loose rocks 9 or the like and sweep them up an inclined apron 10 where they move onto a longitudinal conveyor assembly 11 for transport to the rear of the machine.

As best shown in FIG. 1, gathering implement assembly 8 generally comprises a boom structure 12 mounted for horizontal swinging pivotal movement about a vertical axis. Boom structure 12 carries a suitable material handling implement, such as a gathering tool 13, with angular vertical positioning of the elements being accomplished via a series of cylinders 14,15 and 16, all controllable from the cab in the usual well-known manner.

Apron 10 is adapted to normally ride on the ground ahead of conveyor assembly 11 and is shown as having a central plate-like bed 17 with a front edge 18, a narrow rear edge 19 and suitable raised side members 20 which form a channel or throat through which material is forced by forward machine movement and/or gathering implement assembly 8. The transverse rear edge 19 of bed 17 is disposed above the front end portion of conveyor assembly 11 to thereby provide a clearance space or gap 21 for transfer of material from the apron to the conveyor. See FIG. 3. This gap should be kept at a minimum.

Figure 3:
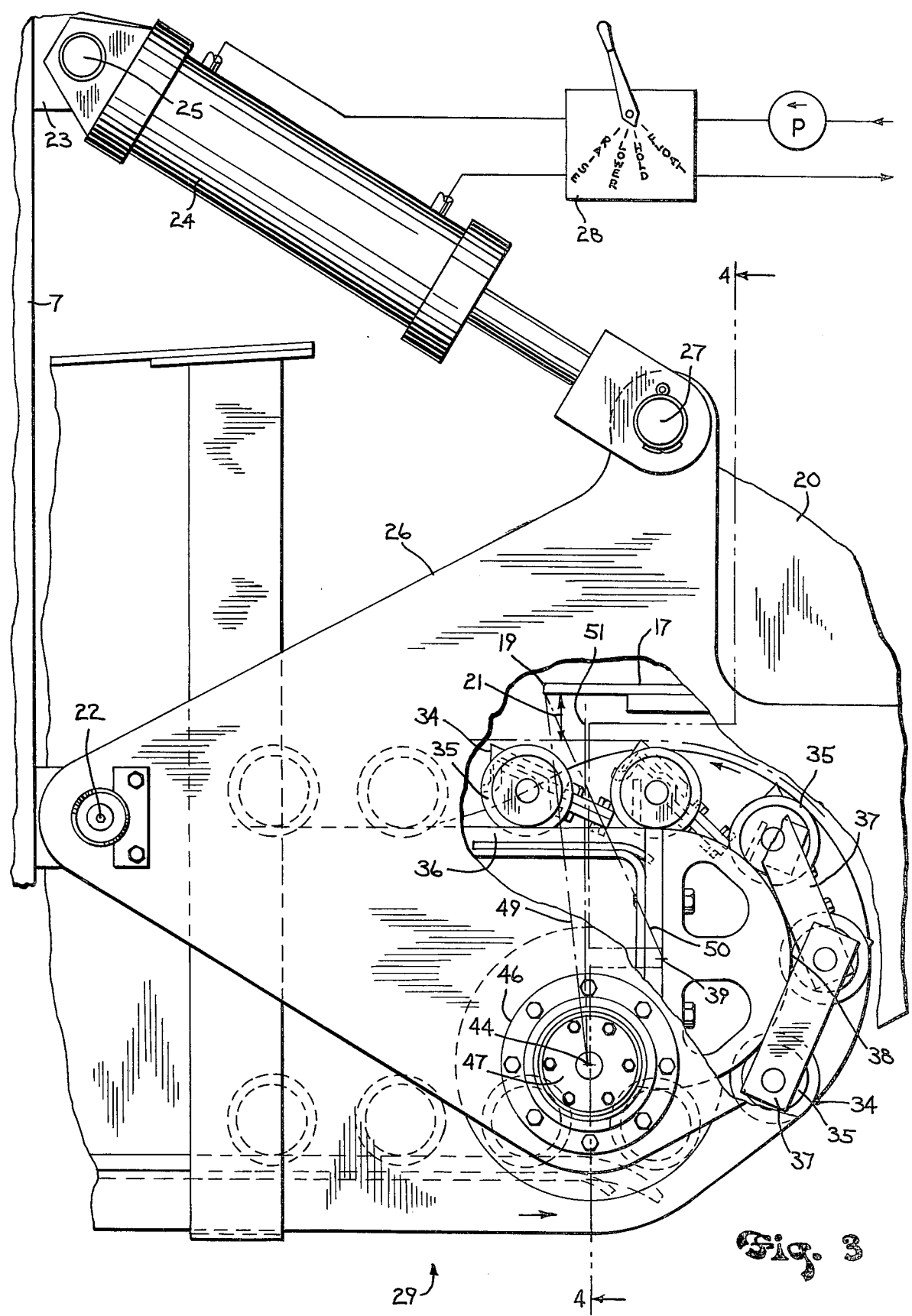
FIG. 3 is a view similar to FIG. 2 and showing the apron-conveyor connection of the present invention.

The rear edge 19 of apron 10 is mounted for pivoting about a transverse horizontal axis 22, and means are provided to pivot the apron about said axis. For this purpose, and as best shown in FIGS. 1 and 3, a pair of brackets 23 are mounted on plates 7, with each bracket being pivotally connected to the upper end of an apron pivot cylinder 24, as at 25. The lower ends of cylinders 24 are pivotally mounted to transversely spaced base portions 26 of apron 10, as at 27. Cylinders 24 are of the double acting type and are controlled from the cab in any suitable well-known manner to lift and lower the apron, hold it in any desired raised position, or to permit it to float with its front edge 18 on the ground, as shown in full lines in FIG. 1. The cab control panel 28 for the cylinders is shown schematically in FIG. 3.

Conveyor assembly 11 is shown as having a relatively long forward section 29 of steep inclination, and which merges into a shorter rearward section 30 of lesser incline.

For purposes of support and vertical conveyor adjustment, vertical struts 31 are disposed at the rear of frame 3, and cylinders 32 are connected between the struts and rear conveyor section 30. In addition, an articulated conveyor joint 33 may be provided in front conveyor section 29, as more fully described in the aforementioned patent.

As best shown in FIGS. 3 and 4, the conveyor comprises a plurality of transverse conveying elements 34 having end rollers 35 adapted to ride on the upper and lower edges of spaced tracks 36 which form part of the conveyor assembly framework. Rollers 35 are connected to each other by pivotal links 37 in the usual manner. At the conveyor front end, return portion tracks 36 are formed with arcuate semi-circular edges 38 having a center of curvature defining a transverse axis 39. Thus, as the conveying elements 34 reach the front end of the lower track edges, they are carried around arcuately to the upper track edges for the conveyor return. It is at this point that material is dropped over apron edge 19 onto the conveyor. The gap 21 is defined by the distance between edge 19 and the elements 34.

Figure 2:
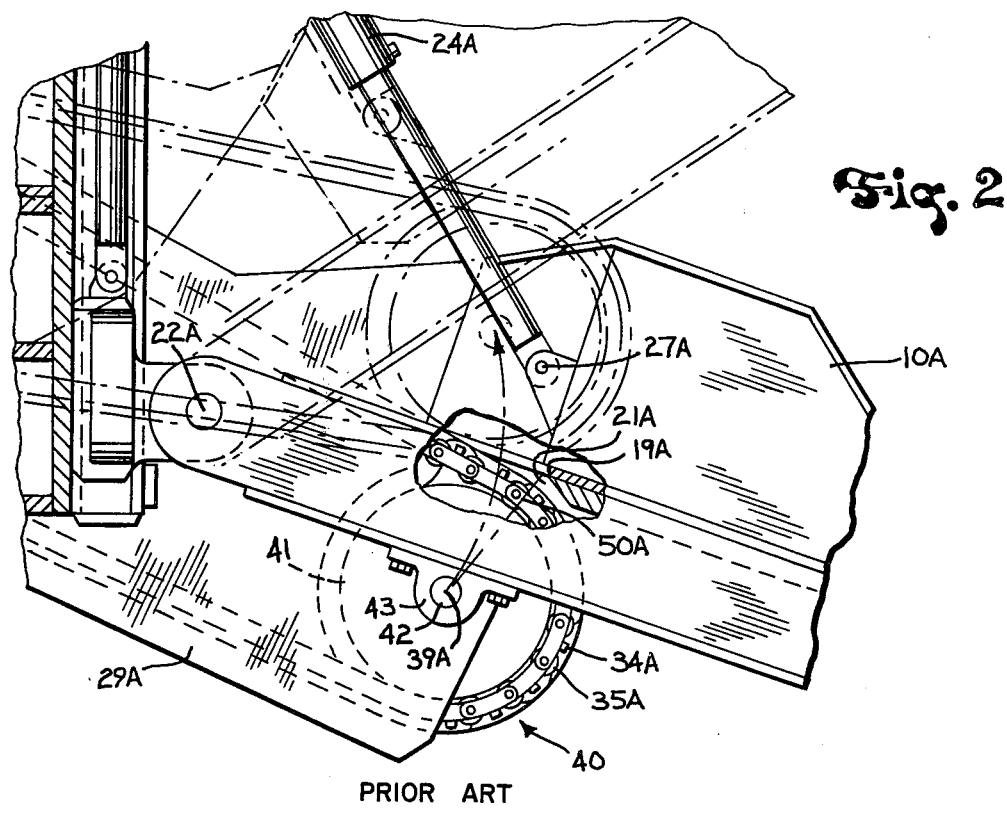
FIG. 2 is an enlarged fragmentary side elevation, with parts broken away and in section, of the apron-conveyor connection of the prior art.

Turning now to the prior art showing of FIG. 2, the apron 10A is pivotally mounted at its rearward portion for vertical movement about a transverse horizontal pivot axis 22A. This is accomplished by a pair of apron pivot cylinders 24A which are connected between the front machine framework and a pivotal connection 27A on the apron. Apron 10A has a rear edge 19A over which gathered material drops onto the end portion of the front conveyor section 29A. The clearance or gap between edge 19A and the conveyor is shown at 21A.

In the prior art device, an endless conveyor belt is utilized, with the belt including transversely spaced chains 40 having rollers 35A which are joined by transverse conveying elements 34A. Chains 40 are trained about a pair of rotatable front end return sprockets 41 which are mounted for arcuate rotation about a shaft 42 which defines a transverse axis 39A.

In the prior art device of FIG. 2, apron 10A and conveyor section 29A are pivotally joined so that actuation of cylinder 24A causes section 29A to be carried upwardly and downwardly with apron 10A. This is accomplished by journalling the ends of shaft 42 in transversely spaced bearing supports 43 which are mounted to the underside of apron 10A. The axis 39A is thus common to the center of rotation of conveyor elements 34A on sprockets 41 and to the pivotal connection between the apron 10A and conveyor section 29A. The construction is such that raising and lowering of the co-joined apron and conveyor causes gap 21A to vary in width within a given range.

While the range of gap width of the prior art has been quite adequate for the most part, a narrower range has been deemed desirable to further lessen the danger of jamming of material and the like. The present invention accomplishes the desired result.

Referring to FIGS. 3 and 4, in the device of the present invention the axis of pivotal mount between the apron and conveyor is no longer at 39. Instead, the axis has been spaced downwardly and rearwardly therefrom to a connection along transverse horizontal axis 44. At this position, apron bases 26 are pivotally connected to the side framework 45 of conveyor section 29, as via pivot tube 46, a stub shaft 47 and a bushing 48 which are suitably secured together. Furthermore, the straight line distance between apron edge 19 and axis 44, as represented by line 49, is greater than the straight line distance between apron edge 19 and the axis 39, as represented by line 50. In addition, the axis 44 of apron-conveyor pivotal mount is disposed in a transverse vertical plane 51 which is positioned between edge 19 and center of rotation 39.

It has been found that an increase in distance of line 49 over line 50 of slightly over 50% provides a substantial decrease in the overall range of gap width. Likewise, the gap width range is decreased by moving the apron-conveyor connection axis down slightly less than ½ of distance 50 and rearwardly slightly less than ½ of distance 50.

Figure 5:
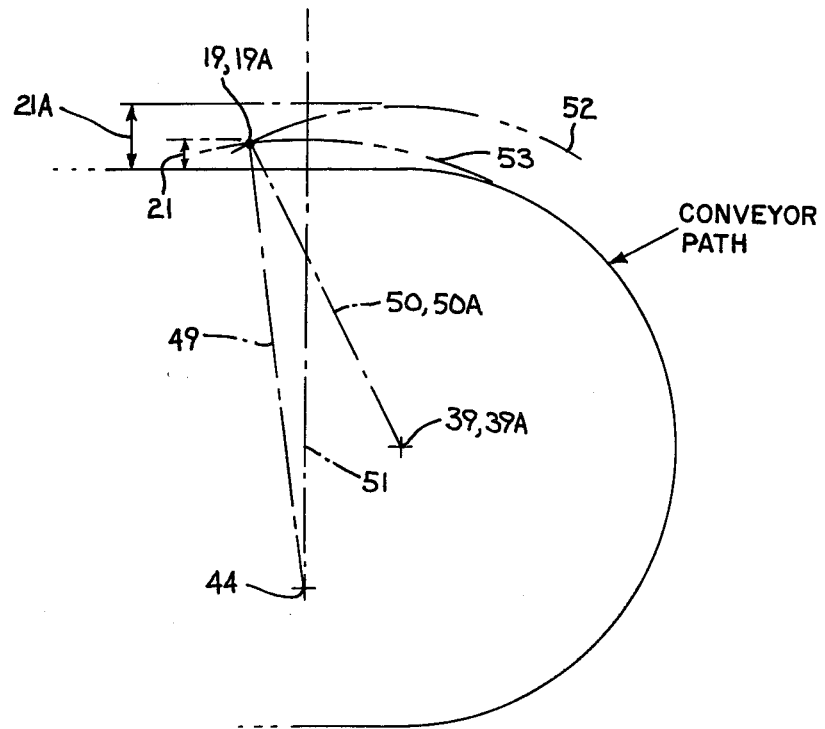
FIG. 5 is a geometrical representation of the concept of the invention, as compared to the prior art.

FIG. 5 is a schematic geometric representation of the concept of the invention and also showing certain features of the prior art for comparison. Thus, the axis 39 of the present invention coincides with the axis 39A of the prior art (FIG. 2), but is not the pivotal mount between the apron and conveyor. Likewise, the distances 50 and 50A coincide between axis 39, 39A and apron edge 19, 19A.

In devices of the type where the conveyor and apron are pivotally joined, and wherein the apron is raised and lowered about a second pivot, the rear apron edge moves in a compound manner. That is, the edge arcuately moves about the second pivot, but it also rotates about the axis of pivotal connection between the apron and conveyor.

Thus, and referring to the prior art showing in FIG. 5, the distance 50A represents a radius with axis 39A at its center and edge 19A at its outer end. Raising or lowering of apron 10A causes edge 19A to move about axis 39A in an arc 52, as part of its compound movement. The arc defines the maximum range of gap width 21A.

In the device of the present invention, the distance 49 between edge 19 and the apron-conveyor connection 44 is greater than distance 50, 50A, and also represents a radius. Raising or lowering of apron 10 causes edge 19 to move, not about axis 39, but about axis 44, in an arc 53 and as part of the compound movement.

Because of the length of radius 49 and the positioning of axis 44, arc 53 is flatter than arc 52 of the prior art and thus defines a maximum range of gap width 21 which is substantially less than in the prior art device. The maximum distance of edge 19 from the conveyor is also reduced.

The concept of the invention provides an improved structure wherein the clearance between the apron and conveyor is desirably reduced further from that of the prior art.

Various modes of carrying out the invention are contemplated as being within the scope of the following claims particularly pointing out and distinctly claiming the subject matter which is regarded as the invention.

I claim:

1. In a machine for loading and conveying loose material such as rocks and the like:
   (a) transport means for supporting and moving said machine on the ground,
   (b) a machine frame carried by said transport means,
   (c) material gathering means connected to the front portion of said frame,
   (d) an elongated conveyor extending longitudinally from the front to the rear of the machine and with said conveyor having a front end return portion arcuately movable about a first transverse horizontal axis,
   (e) an apron disposed at the front of the machine and having a bed extending forwardly from above the front portion of said conveyor for transfer of material from said gathering means to said conveyor,
   (f) means mounting the rear portion of said apron for pivotal movement about a second transverse horizontal axis,
   (g) means pivotally mounting the front portion of said conveyor to said apron on a third transverse horizontal axis,
   (h) said third axis being spaced downwardly and rearwardly from said first axis,
   (i) and means for pivoting said apron about said second axis.

2. In the machine of claim 1:
   (a) a transverse edge disposed at the rear of said apron and with said edge disposed above said conveyor to form a clearance space therebetween,
   (b) the straight line distance between said edge and said third axis being greater than the straight line distance between said edge and said first axis.

3. In the machine of claim 1:
   (a) a transverse edge disposed at the rear of said apron and with said edge disposed above said conveyor to form a clearance space therebetween,
   (b) said third axis being disposed in a transverse vertical plane which is positioned between said edge and said first axis.

4. In the machine of claim 1:
   (a) a transverse edge disposed at the rear of said apron and with said edge disposed above said conveyor to form a clearance space therebetween,
   (b) the straight line distance between said edge and said third axis being greater than the straight line distance between said edge and said first axis,
   (c) said third axis being disposed in a transverse vertical plane which is positioned between said edge and said first axis.

5. The machine of claim 2 or 4 wherein:
   (a) the straight line distance between said edge and said third axis is more than 50% greater than the straight line distance between said edge and said first axis,
   (b) said third axis is spaced down from said first axis a distance less than ½ the straight line distance between said edge and said first axis,
   (c) and said third axis is spaced rearwardly from said first axis a distance less than ⅓ the straight line distance between said edge and said first axis.

* * * * *